United States Patent [19]
Tonooka et al.

[11] Patent Number: 5,848,803
[45] Date of Patent: Dec. 15, 1998

[54] AIR BAG MODULE HAVING MID-RETAINER WITH GUIDE FINS

[75] Inventors: Masami Tonooka; Yoshio Horiike; Ryuuji Hori; Katsumi Ishikawa, all of Fuji; Hitoshi Higuchi; Takeshi Kai, both of Wako, all of Japan

[73] Assignees: Nihon Plast Co., Ltd., Fuji; Honda Giken Kogyo Kabushiki Kaisha, Tokyo, both of Japan

[21] Appl. No.: 792,351

[22] Filed: Feb. 5, 1997

[30] Foreign Application Priority Data

Feb. 6, 1996 [JP] Japan .................................. 8-020213

[51] Int. Cl.⁶ .................................................. B60R 21/26
[52] U.S. Cl. ............................................ 280/740; 280/732
[58] Field of Search ................................ 280/740, 742, 280/736, 737, 732, 730.1, 728.2

[56] References Cited

U.S. PATENT DOCUMENTS

| | | | |
|---|---|---|---|
| 3,602,526 | 8/1971 | Brawn ........................................ | 280/740 |
| 5,370,416 | 12/1994 | Hamada .................................. | 280/728.2 |
| 5,470,105 | 11/1995 | Rose et al. ............................... | 280/740 |
| 5,482,313 | 1/1996 | Ikeya et al. .............................. | 280/732 |
| 5,564,732 | 10/1996 | Bauer et al. ............................. | 280/732 |

FOREIGN PATENT DOCUMENTS

| | | | |
|---|---|---|---|
| 5-116583 | 5/1993 | Japan ..................................... | 280/732 |
| 07223504 | 8/1995 | Japan . | |

Primary Examiner—Peter C. English
Attorney, Agent, or Firm—Joseph C. Mason, Jr.; Dennis G. LaPointe

[57] ABSTRACT

An air bag apparatus is provided which stably projects the air bag towards the front of a passenger. A retainer 12 stores therein an inflator 14 for injecting gas from gas injection holes at one end of the inflator, and an air bag 15 which is folded. A mid-retainer 16 is provided between inflator 14 and air bag 15. Mid-retainer 16 is provided with a plurality of guide fins 61, which are formed by making cuts in the mid-retainer and bending the cut portions. The direction of gas flow is adjusted by the inclination of each guide fin 61. The gas discharge rate is adjusted by setting various distances between each two adjacent guide fins 61 as to be greatest at the central part of the mid-retainer and either side of the center portion having a gas discharge rate approximately equal to its corresponding opposite side, thereby ensuring air bag 15 will be projected stably.

10 Claims, 3 Drawing Sheets

AIR BAG MODULE HAVING MID-RETAINER WITH GUIDE FINS

FIELD OF THE INVENTION

The present invention relates to an air bag apparatus for injecting gas into an air bag to open and inflate it, said air bag apparatus to be used for, for example, the passenger seat of a vehicle.

BACKGROUND OF THE INVENTION

An example of a conventional air bag apparatus of this type is offered in Japanese Patent Laid-Open No. 223504/1995, which discloses an air bag apparatus for the passenger seat of an automobile which is attached to the automobile's instrument panel. An air bag apparatus according to said patent public disclosure is provided with an inflator comprised of a case which is filled with high pressure gas, and an air bag to be inflated by the gas injected by the inflator. The inflator is so disposed as to encompass the mouth of the air bag and has a gas injection nozzle at one end of the inflator. Therefore, in order to inject the gas evenly into the air bag, a plurality of slanted cut-and-bent portions are formed on the partition wall which separates the inflator from the air bag.

The configuration of the conventional air bag apparatus described above has as its purpose to inject the gas evenly into the air bag regardless of the location of the gas injection nozzle in cases where the nozzle is provided at an end of the inflator.

In view of the prior art at the time the present invention was made, it was not obvious to those of ordinary skill in the pertinent art how an air bag apparatus for stably projecting the air bag in a specified direction could be provided.

SUMMARY OF THE INVENTION

The long-standing but heretofore unfulfilled need for improvements in air bag apparatuses is now met by an improved air bag apparatus, comprising: an air bag having a gas inlet opening and an inflator having gas injection holes which are contained in a retainer, having walls, in such a manner that the gas inlet opening and the gas injection holes face each other, and a gas injection direction control means which is disposed between the gas inlet opening and the gas injection holes and is affixed to the walls of the retainer, wherein the gas injection direction control means controls the gas flow in such a manner that a greater quantity of gas is injected toward a central part of the air bag than toward a peripheral part of the air bag. In addition, the air bag can be projected stably in the direction of the center axis of the air bag regardless of the positional relationship between the gas inlet opening of the air bag and the gas injection holes of the inflator.

A further embodiment of the present invention provides an air bag apparatus having a gas inlet opening, an inflator having gas injection holes, and a gas injection direction control means disposed between the gas inlet opening and the gas injection holes, wherein the gas injection direction control means causes gas to be injected in the direction of a passenger who is seated in the normal forward facing position. The air bag can be projected stably in the direction of the passenger regardless of the positional relationship between the gas inlet opening and the gas injection holes of the inflator.

The gas injection direction control means is provided with a plurality of guide fins with apertures formed between each respective two fins of the guide fins. The direction in which gas is injected can easily be adjusted by means of the inclination angle of each guide fin, and the gas flow rate at each aperture can also be adjusted by setting the distance between each two adjacent guide fins at a desired length. The gas injection direction control means of the present invention is formed by making cuts in a partition and bending the cut portion to protrude at an angle, thereby forming guide fins and apertures. The present invention simplifies the structure of an air bag apparatus and production costs can therefore be reduced. The guide fins of the present invention are formed by bending the cut portion in the partition in such a manner that the surface of each cut portion of the partition, at a side where the inflator is located is so inclined as to face the direction of the gas injection holes of the inflator. Accordingly, the direction in which gas is injected can easily be set so as to correspond to the direction in which the air bag should be projected.

The guide fins are arranged such that the distance between each respective two adjacent guide fins, in the direction in which the gas inlet opening extends is not greater than 50 mm. The gas injection control means of the present invention can easily be formed at reduced costs, while ensuring effective control of the direction of gas injection. Each guide fin has a height, i.e., the dimension along the direction in which the air bag should be projected, ranging between 3 mm and 30 mm. Further, each guide fin is inclined at an angle ranging between 30° to 60° with respect to the surface of the gas inlet opening. The distances between each two adjacent guide fins in the direction in which said gas inlet opening extends is greatest at the central part, while the distances are next greatest at the side opposite the gas injection holes and shortest at the side where the gas injection holes are located. Accordingly, the guide fins are formed at short intervals, in other words in close proximity to one another, in order to limit the gas discharge rate at the side where the gas injection holes are located and the flow of gas is strong, and the fins are sparsely formed at long intervals in order to increase the gas discharge rate at the side opposite the gas injection holes, where the flow of gas is weak. In the center, where the strength of the gas flow is approximately half of the distance between the two sides, the guide fins are arranged at the longest interval, in other words the most sparsely formed, in order to increase the gas discharge rate. Therefore, the gas is injected with the greatest force at the central part and with the same force to both sides of the center so that the air bag can be stably projected in a desired direction.

The above, and other objects, features and advantages of the present invention will become apparent from the following description read in conjunction with the accompanying drawings in which like reference numerals designate the same element and the scope of the invention will be indicated in the claims.

DETAILED DESCRIPTION OF THE INVENTION

Figure 1:
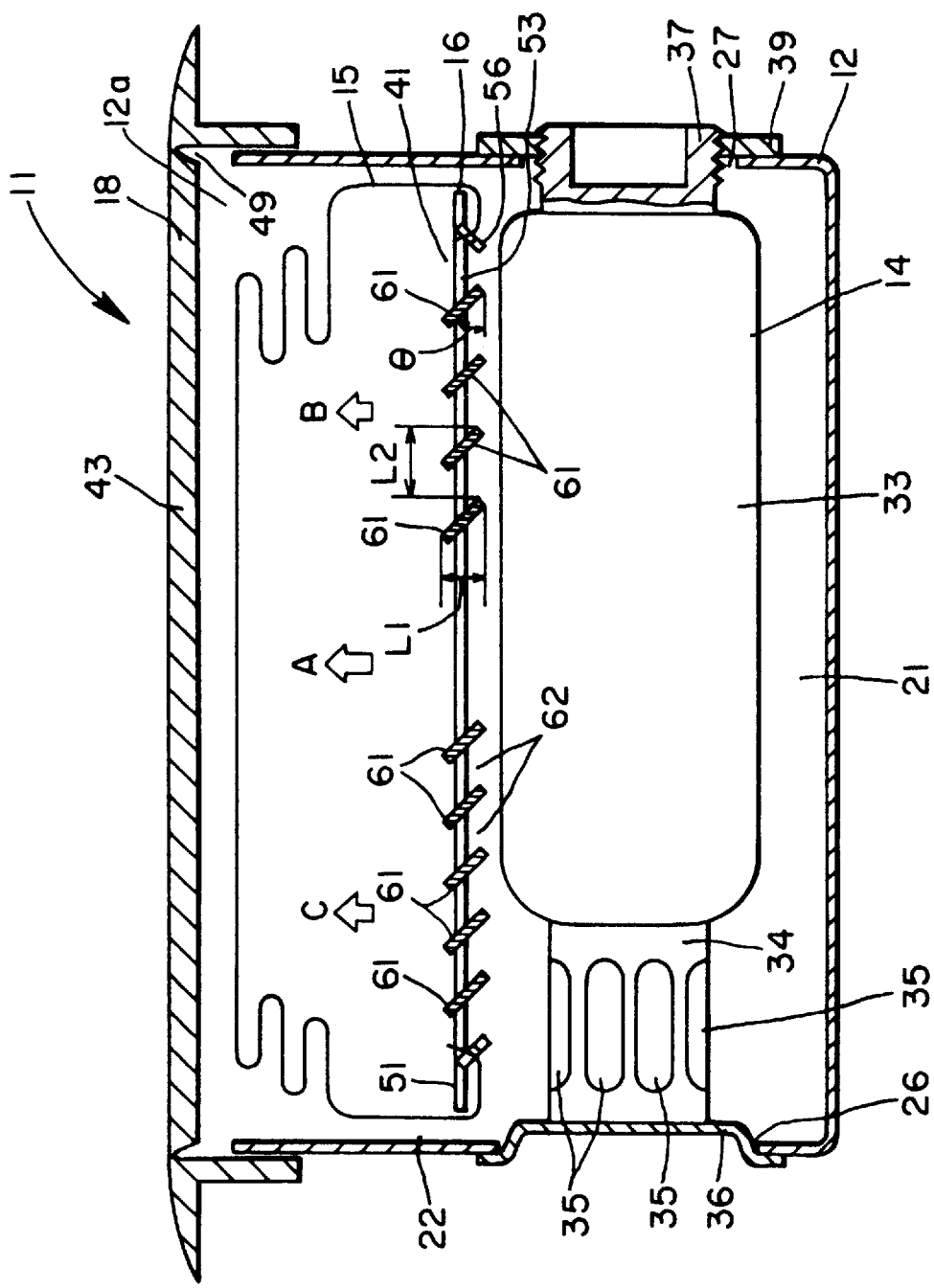
FIG. 1 is a sectional plan view of an air bag apparatus according to an embodiment of the present invention.

Next, the configuration of an air bag apparatus according to an embodiment of the invention is explained hereunder, referring to the drawings.

Figure 2:
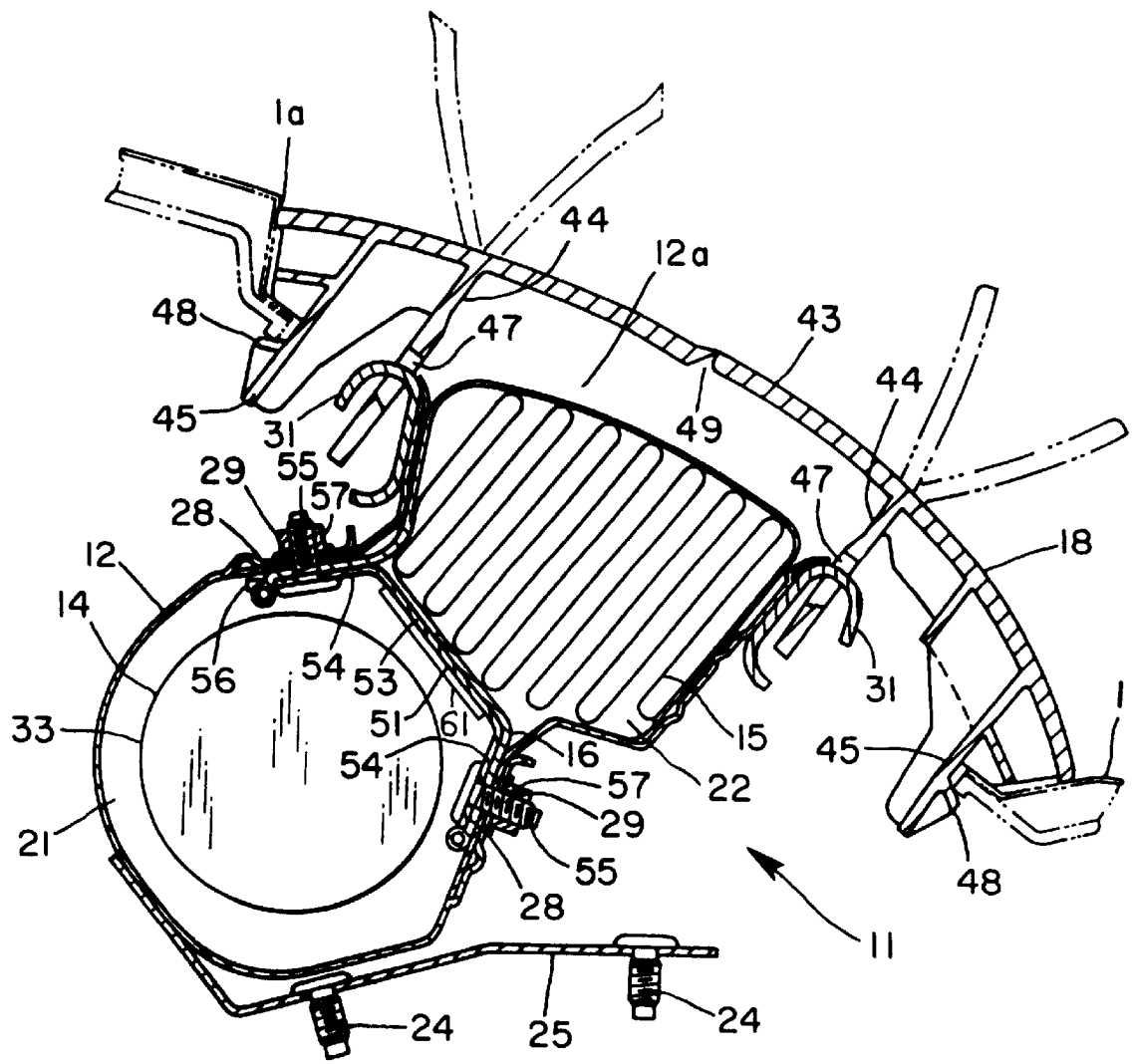
FIG. 2 is a sectional elevational view of same.

Referring to FIG. 2, numeral 1 denotes an instrument panel of an automobile. An air bag apparatus 11 for the passenger seat is attached to the interior of instrument panel 1. As shown in FIGS. 1 and 2, air bag apparatus 11 has a retainer 12, i.e., a case, having an opening 12a and containing an inflator 14 to inject gas, a folded air bag 15, and a mid-retainer 16 serving as a means to control the direction of gas injection. Opening 12a of retainer 12 is covered by a resin cover 18.

More precisely, retainer 12 has an approximately U-shaped section, with a rectangular opening 12a at the top. The lower part of the retainer serves as an inflator containing section 21, while the upper part serves as an air bag containing section 22, with a narrow middle portion therebetween. A mounting plate 25 having bolts 24 fastened thereto is affixed to the bottom of retainer 12 so that air bag apparatus 11 can be fastened to a member of the body of a vehicle. Inflator mounting holes 26, 27 which may be in a circular shape are formed at the respective longitudinal ends of inflator containing section 21. Slanted surface portions 28, 28 slanting outward are formed on the upper inner surface of the respective front and rear end walls of retainer 12. Each slanted surface portion 28 is provided with through holes 29 for bolts, which are bored at specified intervals. Furthermore, a plurality of stopper clips 31 having an approximately C-shaped section are affixed to each outer end of retainer 12, to the front and rear ends of the outer surface near the upper end of the retainer.

Inflator 14 is what is generally called a hybrid inflator, wherein a compressed gas storage chamber filled with compressed gas and a gas generating chamber filled with a solid gas generating agent are provided in a main body 33. Main body 33 is a high pressure gas cylinder, with a breakable partition separating the two chambers. Provided at a lengthwise end of main body 33 is an approximately cylindrical gas exit portion 34, around which a plurality of gas injection holes 35 in the shape of an elongated hole are formed. Inflator 14 also has a dish-shaped cover 36, which is affixed to the end of gas exit portion 34, and an approximately cylindrical bolt portion 37, which is located at the bottom of main body 33. Inflator 14 structured as above is fastened to inflator containing section 21 of retainer 12 by inserting bolt portion 37 of the inflator from the outside through inflator mounting hole 26 at one end of inflator containing section 21 until bolt portion 37 projects from inflator mounting hole 27 at the opposite end, and firmly screwing a nut 39 around bolt portion 37 in the state where cover 36 is in contact with inflator mounting hole 26.

Air bag 15 is a cloth bag having a rectangular gas inlet hole or opening 41 around the inner rim of retainer 12. After being folded into a wave-like state, air bag 15 is placed in air bag containing section 22 and stored therein in a rolled up state.

Cover 18 is formed of a resin or the like as an integral body comprising a cover plate portion 43 for covering an opening 1a formed in instrument panel 1, a pair of mounting pieces 44 projecting downward from the underside of cover plate portion 43, and stopper pieces 45 which also project downward from the underside of cover plate portion 43. Mounting pieces 44 are respectively located towards the front end and the rear end, and stopper pieces 45 are provided closer to the respective ends than are mounting pieces 44. Each mounting piece 44 has mounting holes 47 for catching respective stopper clips 31 of retainer 12. Further, a stopper protrusion 48 to be stopped by, for example, the rim of opening 1a of instrument panel 1 is formed on each stopper piece 45. Formed in the back surface of cover plate portion 43 is an indented tear line 49, which may be in the shape of an H or any other suitable shape, in order to make the region weaker than the remaining part.

Mid-retainer 16 has a main body 51 which is formed by, for example, bending a rectangular metal plate and then cutting and pushing a part thereof. Main body 51 has a flat and rectangular partition 53 and a pair of fastening plate portions 54, 54, each of which is slanted downward from each respective end of partition 53 so that the lower end of main body 51 is wider than the upper end. A plurality of bolts 55 projecting outward are fastened to each fastening plate portion 54 at regular intervals, and one or more air bag stopper clips 56 respectively protrude from the lower end of one of fastening plate portions 54 and both lengthwise ends of the partition.

Mid-retainer 16 structured as above is fastened to the inner side of retainer 12 by inserting bolts 55 through respective bolt through holes 29, with fastening plate portions 54 facing respective slanted surface portions 28, 28 of retainer 12, and tightening the bolts from outside the retainer with nuts 57. In this state, the end portion of air bag 15 is held by air bag stopper clips 56 and supported between fastening plate portions 54 and slanted surface portions 28. Thus, air bag 15 is fastened with gas inlet opening 41 covering partition 53 so that a specified distance is maintained between air bag 15 and inflator 14. Partition 53 extends parallel to the surface of gas inlet opening 41 and perpendicular to the direction in which air bag 15 will project when inflated, in other words at a right angle to a passenger who is seated correctly in the passenger seat.

Numerous approximately-rectangular shaped guide fins 61 are formed along the area from the upper end of one of fastening plate portions 54 across partition 53 to the upper end of the other fastening plate portion of mid-retainer 16 by making cuts in the mid-retainer and bending the cut portions. Spaces between these guide fins 61 serve as apertures 62 which communicate inflator containing section 21 and air bag containing section 22 with each other. Guide fins 61 are formed in the same shape and are inclined at the same angle, i.e., at a specified angle θ, which ranges between 30° and 60° with respect to the direction in which partition 53 extends, (θ is 45° in case of the present embodiment), with the underside oriented towards gas injection holes 35 of inflator 14, and height L1 perpendicular to the direction in which partition 53 extends ranging between 3 mm and 30 mm.

A distance L2 between two adjacent guide fins 61 does not exceed 50 mm and varies depending on the location of guide fins; L2 is greatest at the center of the length of the entire area where guide fins 61 are formed, the next greatest near the base end of main body 33 of inflator 14, and shortest, in other words the guides fins are formed in close proximity to one another, near the gas injection holes 35 of inflator 14.

When assembling an air bag apparatus 11 described above, first of all, attach air bag 15 to mid-retainer 16, and fasten mid-retainer 16 in retainer 12. Then, after folding and disposing air bag 15 in retainer 12, place cover 18 on opening 12a, and, finally, insert and fasten inflator 14 into retainer 12.

In the event of a collision of a vehicle equipped with said air bag apparatus 11, a sensor (not shown) detects the collision and actuates inflator 14 to generate high temperature, compressed gas through the enabling of the aforementioned gas generating agent which is ignited by an ignition device, thereby breaking the breakable partition and sending the high temperature, compressed gas into the compressed gas storage chamber, where the high temperature gas is mixed with the compressed gas which fills the chamber. The mixed gas is then injected through gas injection holes 35 formed at one of the lengthwise ends of inflator 14.

The direction and quantity of the gas injected through gas injection holes 35 are adjusted by guide fins 61 and apertures 62 of mid-retainer 16. More precisely, in inflator containing section 21, gas injected from a location near one end of gas inlet opening 41 of air bag 15 flows diagonally in the direction in which air bag 15 will be projected, and the direction of the gas flow is then changed by air bag stopper clips 56 at both ends of mid-retainer 16. Guided by slanted guide fins 61, however, the direction of the gas flow is adjusted so that the gas is injected in the direction in which air bag 15 will be projected, straight towards a passenger who is seated in the normal forward-facing position. Guide fins 61 are arranged in such a way that a distance between two adjacent fins is greatest at the central part of mid-retainer 16 (represented by A in FIG. 1), the next greatest at the base end side (represented by B in FIG. 1) which is a long distance from gas injection holes 35 of inflator 14, and shortest, in other words, guide fins 61 are formed in close proximity to one another, near the gas injection holes 35 of inflator 14 (represented by C in FIG. 1). Therefore, the gas discharge rate is so adjusted as to be greatest at the central part and either side of the center portion having an approximately equal gas discharge rate to its corresponding opposite side.

Figure 3:
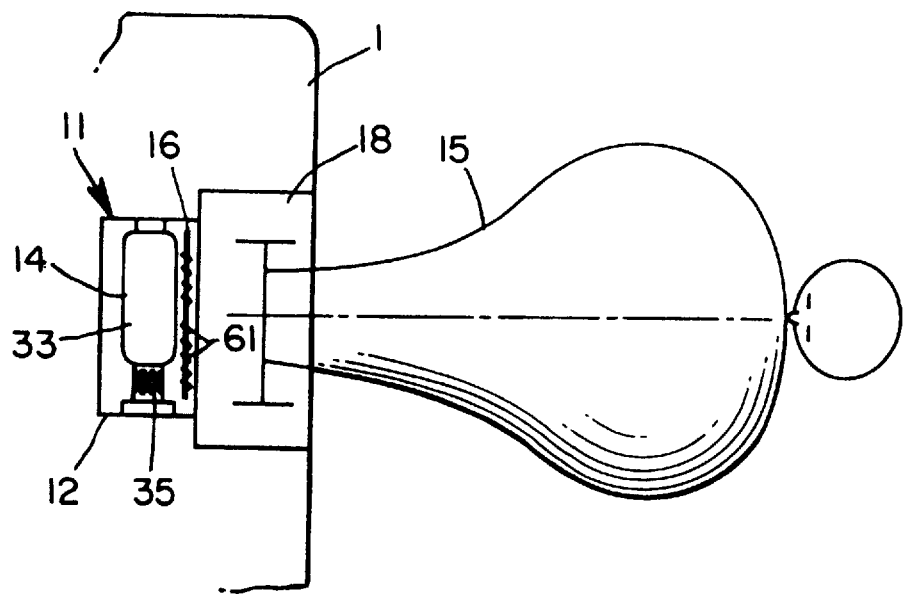
FIG. 3 is a plan view explanatory drawing to illustrate the function of same.
Figure 4:
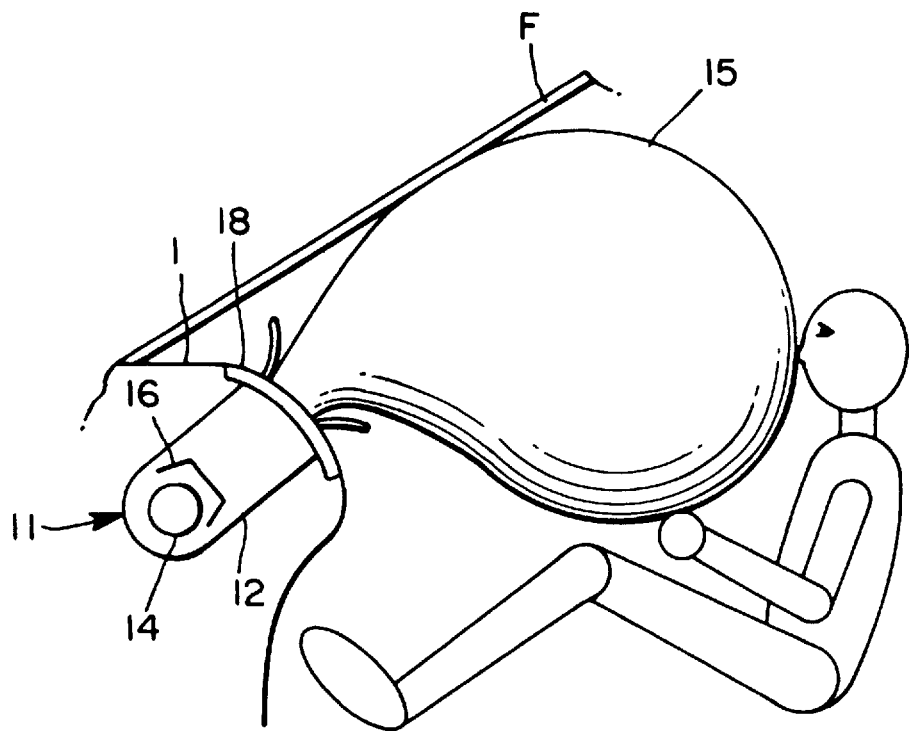
FIG. 4 is an elevational view explanatory drawing to illustrate the function of same.

As a result of the pressure of the gas, air bag 15 is inflated and unfolded, thereby tearing cover plate portion 43 of cover 18 along tear line 49 and opening cover plate portion 43 as shown with imaginary lines in FIG. 2. As a result, air bag 15 is projected from retainer 12 and continues to be unfolded and inflated at the same time, along front windshield F straight towards the front of the passenger as shown in FIGS. 3 and 4, thereby protecting the passenger.

As described above, according to the configuration of the present embodiment which uses an inflator 14 of a hybrid type or a similar type, even in cases where gas is injected from a location near one end of gas inlet opening 41 of air bag 15, the direction in which the gas is injected can be controlled by slanted guide fins 61 formed on mid-retainer 16 by making cuts in mid-retainer 16 and bending the cut portions. The injection rate of gas at each of the locations of partition 53 can be adjusted by varying the distance between two adjacent guide fins 61, in other words providing apertures 62 of various sizes. With the configuration as above, air bag 15 can be projected, stably and without wobbling, straight towards the front of the passenger as shown in the illustrations, thereby snugly enveloping and protecting the passenger.

By forming mid-retainer 16 within specified sizes and inclination ranges described above, the embodiment is capable of simplifying the structure of an apparatus, thereby making it easy to be produced with reduced production costs, in addition to causing air bag 15 to project stably and straight towards the front of the passenger.

Further, although the invention is explained referring to the above embodiment which uses an inflator 14 of a hybrid type or a similar type, the invention is also applicable to what is normally called a pyro-type inflator or the like, which calls for injecting gas through the enabling of a gas generating agent, as long as the inflator has a configuration where the gas injection hole or holes are not located at the central part of gas inlet opening 41.

The gas injection direction control means, of the present invention, controls the gas flow in such a manner that a greater quantity of gas is injected towards the middle region of the air bag than towards the peripheral portion of the air bag. Therefore, the air bag can be projected stably in the direction of the center axis of the air bag regardless of the positional relationship between the gas inlet opening of the air bag and the gas injection holes of the inflator.

As the gas injection direction control means of an air bag apparatus of the invention causes the gas to be injected towards a passenger who is seated in the normal forward-facing position, the air bag can be projected stably towards the passenger regardless of the positional relationship between the gas inlet opening of the air bag and the gas injection holes of the inflator.

The gas injection direction control means, of the present invention, is provided with a plurality of guide fins and apertures formed between each adjacent two fins of the guide fins. The air bag is capable of easily adjusting the gas injection direction by means of the inclination angle of each guide fin and also easily adjusting the gas flow rate at each aperture by setting the distance between each two adjacent guide fins at a desired length. As a result, the air bag can be easily and stably projected in a desired direction.

The gas injection direction control means is formed by making cuts in a partition and bending the cut portions to protrude at an angle, thereby forming guide fins and apertures. Therefore, the present invention provides an apparatus that is capable of adjusting the gas injection direction and the gas flow rate with a simple structure. As a result, production costs can be reduced.

The guide fins are formed by making cuts in the partition in such a manner that the surface of the partition which faces the inflator is so inclined as to face the direction of the gas injection holes of the inflator. Therefore, the air bag apparatus is capable of easily controlling the gas injection direction as to correspond to the direction in which the air bag should be projected.

A plurality of guide fins are arranged wherein the distance between each two adjacent guide fins, in the direction in which the gas inlet opening extends, is not greater than 50 mm. Further, the height of each guide fin, i.e., the dimension along the direction in which the air bag should be projected, is between 3 mm and 30 mm. In addition, each guide fin is inclined at an angle ranging between 30° and 60° with respect to the surface of the gas inlet opening. Therefore, the present invention is capable of effective control of the direction of gas injection and facilitates formation of the gas injection direction control means, thereby reducing production costs.

The distances between each two adjacent guide fins, in the direction in which the gas inlet opening extends is greatest at the central part, the next greatest distances between each two adjacent guide fins is at the end opposite the gas injection holes and the distance is shortest at the end where the gas injection holes are located. Therefore, the present invention also easily enables the gas to be injected with the greatest force at the central part of the air bag and with the same force at both sides of the central part of the air bag. Thus, the air bag can be stably projected in a desired direction.

It is to be understood that the following claims are intended to cover all of the generic and specific features of the invention herein described and all statements of the scope of the invention which, as a matter of language, might be said to fall therebetween.

Now that the invention has been described,
What is claimed is:

1. An air bag apparatus comprising:

an air bag having a gas inlet opening;

an inflator having gas injection holes; and a gas injection direction control means including a plurality of guide fins having apertures formed between each respective two adjacent fins of the guide fins, the guide fins being arranged such that a distance at a central point between two adjacent guide fins is greater than a distance between adjacent fins at a peripheral portion, wherein the air bag and the inflator being contained in a retainer having walls, the air bag and the inflator being positioned in the retainer having the gas inlet opening facing the gas injection holes, the gas injection direction control means being disposed between the gas inlet opening and the gas injection holes, and affixed to the walls of the retainer, and the gas injection direction control means controls gas flow providing a greater quantity of gas being injected towards a central portion of the air bag than towards a peripheral portion of the air bag.

2. The air bag apparatus of claim 1 wherein the guide fins are individually configured such that a distance between two adjacent fins is greatest at the central point, the next greatest distance being near a base end of the inflator spaced furthest from the gas injection holes of the inflator, and the shortest distance being near the gas injection holes of the inflator.

3. The air bag apparatus according to claim 2, wherein the guide fins are arranged, in a direction in which the gas inlet opening extends, having a distance between each respective two adjacent guide fins of not greater than 50 mm.

4. The air bag apparatus according to claim 2, wherein each guide fin has a height dimension along a direction in which the air bag projects from 3 mm to 30 mm.

5. The air bag apparatus according to claim 2, wherein each guide fin is inclined at an angle of from 30° to 60° with respect to a partition between the inflator and the gas inlet opening.

6. An air bag apparatus comprising:

an air bag having a gas inlet opening;

an inflator having gas injection holes; and a gas injection direction control means disposed between the gas inlet opening and the gas injection holes including a plurality of guide fins having apertures formed between each respective two adjacent fins of the guide fins, the guide fins being arranged such that a distance at a central point between two adjacent guide fins is greater than a distance between adjacent fins at a peripheral portion, wherein the gas injection direction control means causes gas injection in a direction of a passenger seated in a normal forward-facing position.

7. The air bag apparatus of claim 6 wherein the guide fins are individually configured such that a distance between two adjacent fins is greatest at the central point, the next greatest distance being near a base end of the inflator spaced furthest from the gas injection holes of the inflator, and the shortest distance being near the gas injection holes of the inflator.

8. The air bag apparatus according to claim 7, wherein the guide fins are arranged, in a direction in which the gas inlet opening extends, having a distance between each respective two adjacent guide fins of not greater than 50 mm.

9. The air bag apparatus according to claim 7, wherein each guide fin has a height dimension along a direction in which the air bag projects from 3 mm to 30 mm.

10. The air bag apparatus according to claim 7, wherein each guide fin is inclined at an angle of from 30° to 60° with respect to a partition between the inflator and the gas inlet opening.

* * * * *